United States Patent
Wang et al.

(10) Patent No.: US 9,455,622 B2
(45) Date of Patent: Sep. 27, 2016

(54) INVERTER AND OVER CURRENT PROTECTION METHOD THEREOF

(71) Applicants: FSP-Powerland Technology Inc., Nanjing (CN); FSP TECHNOLOGY INC., Taoyuan County (TW)

(72) Inventors: Chuan-Yun Wang, Nanjing (CN); Ming Xu, Nanjing (CN); Jian-Guo Mu, Nanjing (CN)

(73) Assignees: FSP-Powerland Technology Inc., Nanjing (CN); FSP TECHNOLOGY INC., Taoyuan (TW)

( * ) Notice: Subject to any disclaimer, the term of this patent is extended or adjusted under 35 U.S.C. 154(b) by 33 days.

(21) Appl. No.: 14/324,086

(22) Filed: Jul. 4, 2014

(65) Prior Publication Data
US 2015/0036397 A1    Feb. 5, 2015

(30) Foreign Application Priority Data
Aug. 1, 2013   (CN) .......................... 2013 1 0331139

(51) Int. Cl.
*H02M 1/32*      (2007.01)
*H02M 7/5387*    (2007.01)
*H02M 1/00*      (2006.01)

(52) U.S. Cl.
CPC ............. *H02M 1/32* (2013.01); *H02M 7/5387* (2013.01); *H02M 2001/0009* (2013.01)

(58) Field of Classification Search
CPC ......... H02M 1/32; H02M 2001/0009; H02M 7/53803; H02M 7/5387; G01R 19/00
USPC .......... 363/55, 56.01–56.1; 361/18, 87, 93.1, 361/93.9; 323/358, 908
See application file for complete search history.

(56) References Cited

U.S. PATENT DOCUMENTS

| | | | | |
|---|---|---|---|---|
| 4,356,543 A | * | 10/1982 | Reynolds | H02M 3/3372 363/56.07 |
| 4,383,293 A | * | 5/1983 | Randall | H02M 3/3376 363/17 |
| 4,816,981 A | * | 3/1989 | Nishihiro | H02M 7/48 363/37 |
| 5,012,400 A | * | 4/1991 | Yasuda | H02M 1/12 363/39 |
| 6,317,339 B1 | * | 11/2001 | Shimazaki | H02J 3/38 363/37 |
| 6,346,800 B1 | * | 2/2002 | Mano | G03G 15/20 323/225 |
| 6,459,597 B1 | * | 10/2002 | Igarashi | H02M 7/5387 363/34 |
| 2006/0232252 A1 | * | 10/2006 | Walters | H02M 3/1588 323/222 |

* cited by examiner

*Primary Examiner* — Jessica Han
*Assistant Examiner* — David A. Singh
(74) *Attorney, Agent, or Firm* — Jianq Chyun IP Office

(57) ABSTRACT

An inverter and an over current protection method thereof are provided. The inverter includes an inverting circuit, a filtering capacitor and an over current protection circuit. The inverting circuit is configured to convert a DC input voltage into an AC output voltage and provide the AC output voltage to a load. The filtering capacitor is coupled to the inverting circuit and the load in parallel. The over current protection circuit is coupled to the inverting circuit and the filtering capacitor and configured to provide an over current protection mechanism. The over current protection circuit detects an AC current on the filtering capacitor and determines whether to enable the over current protection mechanism according to the AC current in order to restrain the power conversion operation of the inverting circuit.

9 Claims, 3 Drawing Sheets

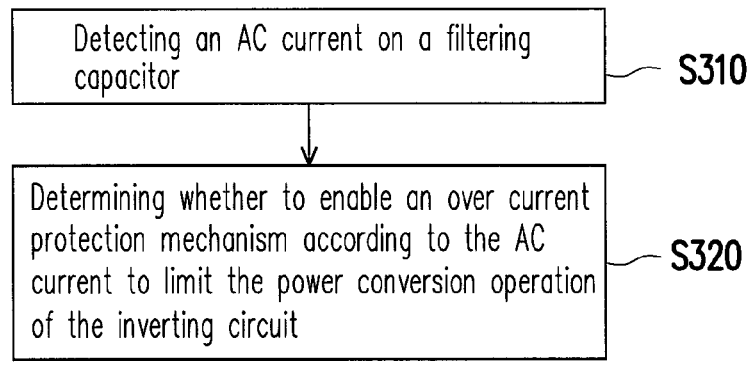
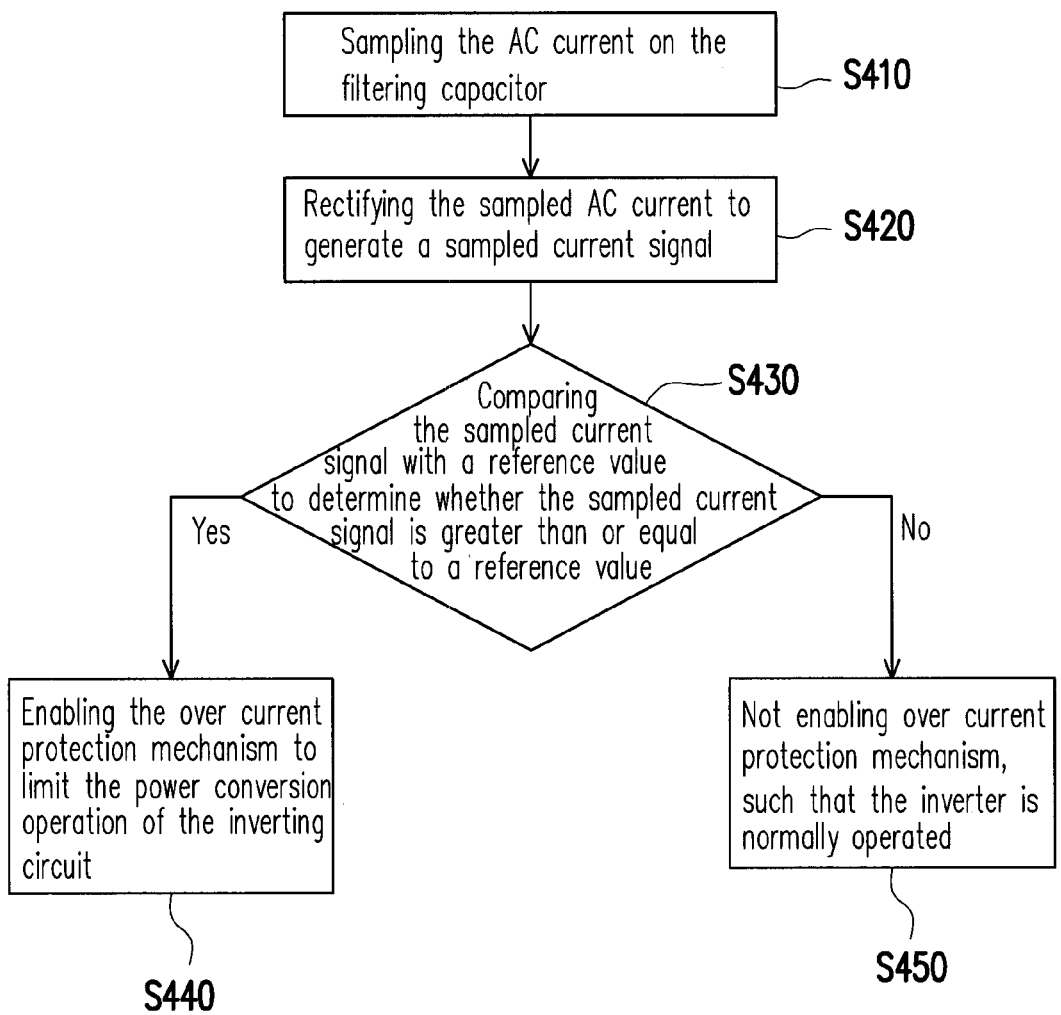

INVERTER AND OVER CURRENT PROTECTION METHOD THEREOF

CROSS-REFERENCE TO RELATED APPLICATION

This application claims the priority benefit of China application serial no. 201310331139.X, filed on Aug. 1, 2013. The entirety of the above-mentioned patent application is hereby incorporated by reference herein and made a part of this specification.

BACKGROUND

1. Field of the Invention

The invention is directed to a power conversion technique and more particularly to an inverter and an over current protection method thereof.

2. Description of Related Art

In order to protect the operational stability of the entire circuit, a designer of an inverter generally adds an over current protection circuit into the inverter. In this way, a corresponding over current protection mechanism will be enabled to protect the entire circuit form being damaged when a large current flows through a circuit of the inverter.

The prior art of the over current protection circuit typically performs a current sampling operation at an output side of the inverter so as to determine whether an over current occurs in the inverter according to the sampled current. Due to the output of the inverter commonly includes DC current, in the conventional over current protection circuit, a Hall sensor is typically required and serves as a current sampling circuit. Nevertheless, the Hall sensor has defects of high latency and high loss, which leads the over current protection circuit incapable of enabling the over current protection mechanism immediately when the over current occurs in the inverter.

Moreover, the output side of the inverter is commonly connected with a filter circuit composed of a capacitor and an inductor. In such configuration, an AC output voltage of the inverter will have a serious inverse drop at the instant of the inverter being connected to a pure capacitive load. As a results, the inverter will generate a larger surge current and the current flows through the inductor will increase significantly (e.g., hundreds of amperes) within a short period (e.g., in a few microseconds). Accordingly, the conventional over current protection circuit can not effectively perform over current protection to improve the aforementioned situation.

SUMMARY

The invention provides an inverter and an over current protection method thereof capable of enabling an over current protection mechanism rapidly when an over current occurs in an inverter.

The invention is directed to an inverter including an inverting circuit, a filtering capacitor and an over current protection circuit. The inverting circuit is configured to convert a DC input voltage into an AC output voltage and provide the AC output voltage to a load. The filtering capacitor is coupled to the inverting circuit and the load in parallel. The over current protection circuit is coupled to the inverting circuit and the filtering capacitor and configured to provide an over current protection mechanism. The over current protection circuit detects an AC current on the filtering capacitor and determines whether to enable the over current protection mechanism according to the AC current in order to restrain the power conversion operation of the inverting circuit.

In an embodiment of the invention, the over current protection circuit includes a current sampling unit, an over current determination unit and a current limiting unit. The current sampling unit is coupled to the filtering capacitor and configured to sample the AC current and rectify the sampled AC current to generate a sampled current signal. The over current determination unit is coupled to the current sampling unit and configured to generate an over current determination signal according to the sampled current signal. The over current determination signal indicates a relative relationship between the sampled current signal and a reference value. The current limiting unit is coupled to the inverting circuit and the over current determination unit and configured to determine whether to enable the over current protection mechanism according to the over current determination signal.

In an embodiment of the invention, when the sampled current signal is greater than or equal to the reference value, the current limiting unit enables the over current protection mechanism according to the over current determination signal to restrain the power conversion operation of the inverting circuit. When the sampled current signal is less than the reference value, the current limiting unit does not enable the over current protection mechanism according to the over current determination signal, such that the inverting circuit is normally operated.

In an embodiment of the invention, the current sampling unit includes a current transformer and a rectifier. The current transformer has a primary winding and a secondary winding. The primary winding is coupled to the filtering capacitor in series. The rectifier is coupled to the secondary winding of the current transformer to generate the sampled current signal according to a signal on the secondary winding.

In an embodiment of the invention, the over current determination unit includes a comparator. The comparator has a first input terminal, a second input terminal and an output terminal. The first input terminal is coupled to the rectifier to receive the sampled current signal, the second input terminal receives the reference value and the output terminal outputs the over current determination signal.

In an embodiment of the invention, the current limiting unit includes a driving circuit coupled to the inverting circuit and the output terminal of the comparator and configured to control the switching of the inverting circuit according to the over current determination signal.

The invention is directed to an over current protection method of an inverter, including the following steps. An AC current on a filtering capacitor is detected and the filtering capacitor is coupled to an inverting circuit and a load in parallel. And, whether to enable an over current protection mechanism is determined according to the AC current to restrain the power conversion operation of the inverting circuit.

In an embodiment of the invention, the step of detecting the AC current on the filtering capacitor includes sampling the AC current and rectifying the sample AC current to generate a sampled current signal.

In an embodiment of the invention, the step of determining whether to enable the over current protection mechanism according to the AC current to restrain the power conversion operation of the inverting circuit includes comparing the sampled current signal with a reference value, if the sampled current signal is greater than or equal to the reference value, enabling the over current protection mechanism to restrain the power conversion operation of the inverting circuit, and if the sampled current signal is less than the reference value, not enabling the over current protection mechanism, such that the inverting circuit is normally operated.

Based on the above, the invention provides an inverter and an over current protection method thereof. The inverter can detect an AC current on a filtering capacitor so as to determine whether to enable an over current protection mechanism accordingly. The inverter of the invention is capable of performing over current protection quickly when an over current occurs. To be more specific, the current change of the filtering capacitor will be ahead of the voltage change of the filtering capacitor so that the inverter can enable the over current protection mechanism in advance in response to the AC current detected on the filtering capacitor when an AC output voltage of the inverter is changed significantly in a short period. The inverter can enable the over current protection mechanism timely to restrain the current of the inverter and won't be affected by the delay of the hardware or the software of the inverter itself. Accordingly, stability of the power conversion operation of the inverter can be enhanced.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a flowchart of an over current protection method of an inverter according to an embodiment of the invention.

FIG. 4 is a flowchart of an over current protection method of an inverter according to another embodiment of the invention.

DESCRIPTION OF EMBODIMENTS

Figure 1:
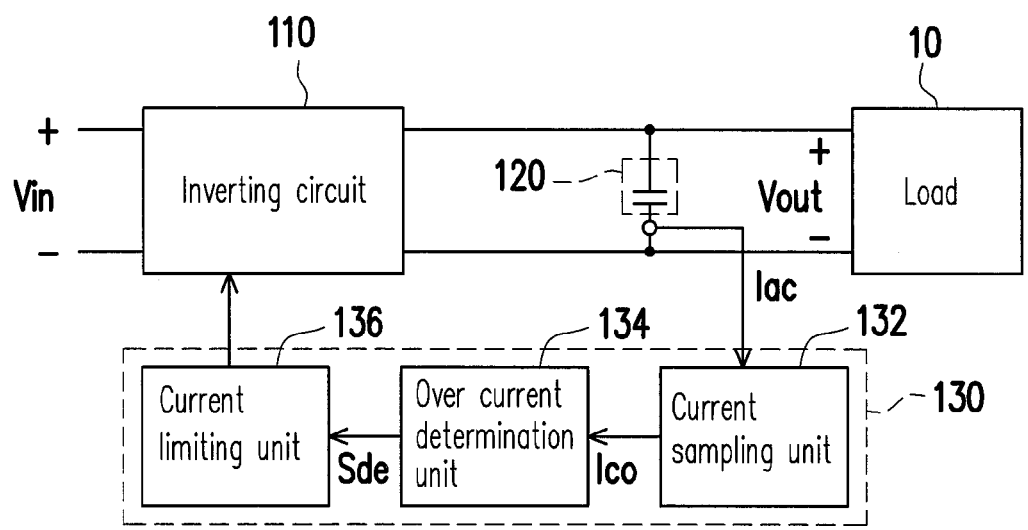
FIG. 1 is a schematic diagram of an inverter according to an embodiment of the invention.

The invention provides an inverter and an over current protection method thereof. The inverter may detect an AC current of a filtering capacitor so as to determine whether to enable an over current protection mechanism accordingly. Accordingly, the inverter of the invention is capable of performing an over current protection quickly when an over current occurs, such that stability of the power conversion operation of the inverter can be enhanced. In order to make the disclosure of the invention more comprehensible, embodiments are described below as examples showing that the disclosure can actually be realized. Wherever possible, the same reference numbers are used in the drawings and the description to refer to the same or like parts.

FIG. 1 is a schematic diagram of an inverter according to an embodiment of the invention. With reference to FIG. 1, an inverter 100 includes an inverting circuit 110, a filtering capacitor 120 and an over current protection circuit 130. An output terminal of the inverting circuit 110 is coupled to the filtering capacitor 120 in parallel, and then, coupled to a load 10. The over current protection circuit 130 is coupled to the inverting circuit 110 and the filtering capacitor 120.

The inverting circuit 110 is configured to convert a DC input voltage Vin to an AC output voltage Vout for the load 10. The filtering capacitor 120 is configured to perform a low-pass filtering operation on the AC output voltage Vout output by the inverting circuit 110, while the over current protection circuit 130 is configured to provide an over current protection mechanism to the inverting circuit 110 for stopping the output of the inverting circuit 110 when an over current occurs.

In the present embodiment, the over current protection circuit 130 detects an AC current Iac on the filtering capacitor 120 to determine whether to enable an over current protection mechanism according to a level of the detected AC current Iac. When the over current protection mechanism is activated, the over current protection circuit 130 controls a power conversion operation of the inverting circuit 110 by a specific controlling means to restrain an output current of the inverting circuit 110 so as to achieve the effect of the over current protection. For instance, the controlling means may be stopping providing a control signal for controlling the switching of the inverting circuit 110 for a period (e.g., half of the duty cycle) when it is determined that the over current occurs in the inverter 110 and then performing a phase-lock operation again during the period to provide the control signal to the inverting circuit 110. Otherwise, when the over current protection mechanism is inactivated, the over current protection circuit 130 does not involve in controlling the inverting circuit 110. Thus, the inverting circuit 110 may operate normally for converting the DC input voltage Vin to the AC output voltage Vout.

It should be noticed here that the aforementioned controlling means of stopping providing to the control signal to the inverting circuit 110 is merely an example of implementing the over current protection mechanism, and the invention is not limited thereto.

Generally speaking specking, in a normal operation state of the inverting circuit 110, the AC output voltage Vout of the inverting circuit 110 is theoretically equal to a voltage drop of the filtering capacitor 120. However, when the inverting circuit 110 is instantaneously coupled to the pure capacitive load 10, or when a transient voltage change occurs in the load 10 (in this case, the load is, for example, a grid), an inverse drop may probably occur to the AC output voltage Vout of the inverting circuit 110, such that a greater surge current is generated in the inverter 100. Under such situation, the conventional over current protection method is incapable of performing a current restraining operation to the inverting circuit 110 before the generation of the surge current.

In comparison with the conventional over current protection mechanism, since the over current protection circuit 130 of the present embodiment determines whether the over current occurs in the inverter 100 by detecting the AC current Iac on the filtering capacitor 120, the over current protection circuit 130 may determine ahead whether the surge current is generated in the inverter 100 so as to quickly and effectively perform the over current protection.

In detail, when the inverse drop occurs to the AC output voltage Vout, the inverse drop also occurs to the voltage of two terminals of the filtering capacitor 120. At this time, the filtering capacitor 120 generates a greater AC current Iac in response to the change of the voltage drop of the filtering capacitor 120 itself. Additionally, in the filtering capacitor 120, a phase of the AC current Iac is ahead of a phase of the voltage drop, and thus, the AC current Iac changes ahead before the generation of the surge current.

According to the aforementioned characteristics of the AC current Iac, the over current protection circuit 130 may previously perform the current restraining operation of the inverting circuit 110 before the transient change occurs to the AC output voltage Vout. Therefore, the defect of the current restraining operation which may be delayed by the hardware or the software in the conventional over current protection mechanism can be improved.

To be more specific, the over current protection circuit 130 includes a current sampling unit 132, an over current determination unit 134 and a current limiting unit 136. The current sampling unit 132 is coupled to the filtering capacitor 120 for sampling the AC current Iac on the filtering capacitor 120 and rectifying the sampled AC current Iac to generate a sampled current signal Ico. The over current determination unit 134 is coupled to the current sampling unit 132 and configured to generate an over current determination signal Sde according to the sampled current signal Ico. The over current determination signal Sde indicates a relative relationship between the sampled current signal Ico (i.e., the rectified AC current Iac) and a reference value and namely, indicates whether the over current occurs in the inverter 100. The current limiting unit 136 is coupled to the inverting circuit 110 and the over current determination unit 134. The current limiting unit 136 is controlled by the over current determination signal Sde to determine whether to enable the over current protection mechanism.

In detail, after the current sampling unit 132 samples and rectifies the AC current Iac, the over current determination unit 134 may determine whether the inverse drop occurs to the voltage drop of the filtering capacitor 120 according to a comparison result associated with the sampled current signal Ico and the reference value of the AC current Iac so as to transmit the corresponding over current determination signal Sde to control the current limiting unit 136. For instance, when determining that the sampled current signal Ico is greater than or equal to the reference value, the over current determination unit 134 generates an enabling over current determination signal Sde (e.g., a high-level signal) to indicate that the over current occurs in the inverter 100. At this time, the current limiting unit 136 enables the over current protection mechanism in response to the enabling over current determination signal Sde to restrain the power conversion operation of the inverting circuit 110, such that the output current of the inverting circuit 110 is lowered down. On the contrary, when the sampled current signal Ico is less than the reference value, the over current determination unit 134 generates a disabling over current determination signal Sde (e.g., a low-level signal) to indicate that the inverter 100 is in a normal operation state. At this time, the current limiting unit 136 does not enable the over current protection mechanism in response to the disabling over current determination signal Sde, such that the inverting circuit 110 will be normally operated.

It is worth to mention that the current sampling unit 132 in the present embodiment may be any circuit structure or chip having a current sampling function. Besides, the over current protection unit 134 may be a comparator or any other software or hardware having a comparison function, which are not limited in the invention.

Figure 2:
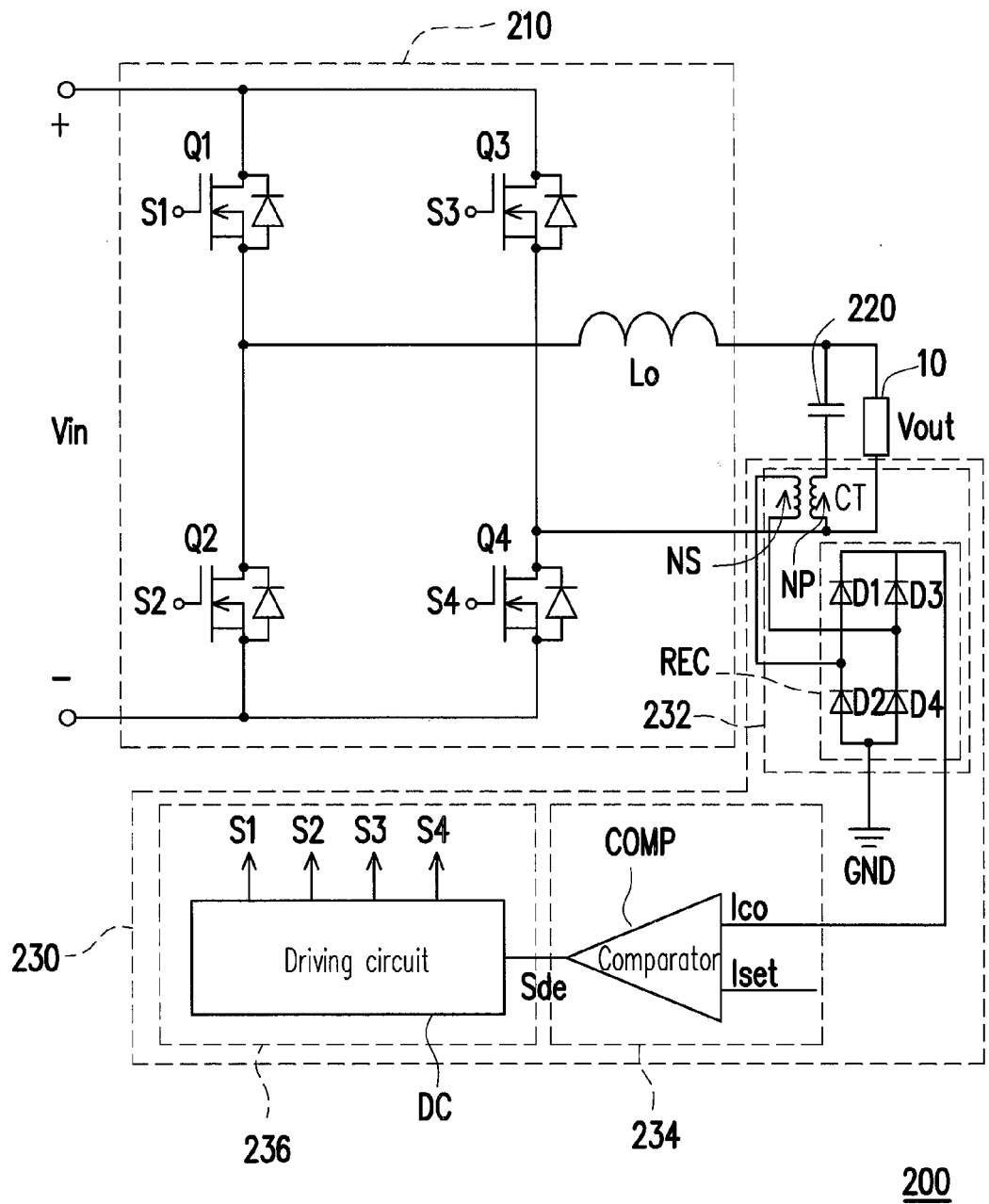
FIG. 2 is a schematic diagram illustrating a circuit structure of the inverter according to an embodiment of the invention.

FIG. 2 is a schematic diagram illustrating a circuit structure of the inverter according to an embodiment of the invention. With reference to FIG. 2, an inverter 200 also includes an inverting circuit 210, a filtering capacitor 220 and an over current protection circuit 230. In the present embodiment, the inverting circuit 210 is illustrated as a full-bridge inverting circuit consisting of switching transistors Q1 through Q4 and a resonant inductor Lo for example, but the invention is not limited thereto.

In the inverting circuit 210, the switching transistors Q1 and Q2 are coupled in series to form a bridge arm. The switching transistors Q3 and Q4 are coupled in series to form another bridge arm. The foregoing two bridge arms are connected in parallel and receive the DC input voltage Vin. A terminal of the resonant inductor Lo is coupled to a common node of the switching transistors Q1 and Q2, and the other terminal of the resonant inductor Lo is coupled to a terminal of the filtering capacitor 220 and a terminal of the load 10. The other terminal of the load 10 is coupled to a common node of the switching transistors Q3 and Q4 and coupled to the other terminal of the filtering capacitor 220 through the current sampling unit 232.

In the over current protection circuit 230, the current sampling unit 232 is implemented by a circuit structure composed of a current transformer CT and a rectifier REC (but the invention is not limited thereto). The current transformer CT has a primary winding NP and a secondary winding NS. The primary winding NP of the current transformer CT is coupled to the filtering capacitor 220 in series, such that the AC current Iac of the filtering capacitor 220 can flow through the primary winding NP of the current transformer CT. The secondary winding NS of the current transformer CT induces a corresponding signal (i.e., a signal associated with the AC current Iac) in response to the AC current Iac flowing through the primary winding NP.

The rectifier REC is coupled to two terminals of the secondary winding NS to rectify signals on the secondary winding NS and generates a sampled current signal Ico accordingly. To be more specific, the rectifier REC of the present embodiment is configured to perform an operation of obtaining an absolute value from a signal sampled by the current transformer CT for conducting the signal comparison and determination by a backend over current determination unit 234. In the present embodiment, the function of getting the absolute value of the rectifier REC is implemented by a full-bridge rectifier consisting of diodes D1 through D4 (but the invention is not limited thereto). A current signal with alternating positive and negative polarities on the secondary winding NS becomes a DC sampled current signal Ico after passing through the full-bridge rectifier. The DC sampled current signal Ico is provided to the over current determination unit 234 for determining whether an over current occurs in the inverter 200 (i.e., whether an inverse drop occurs to the AC output voltage Vout). In other words, the level of the sampled current signal Ico represents the absolute value of the AC current Iac on the filtering capacitor 220.

In the present embodiment, the over current determination unit 234 is implemented by a comparator COMP (but the invention is not limited thereto, and the over current determination unit 234 may also be implemented by any hardware circuit or any software that is capable of carrying out a comparison and determination function), and the current limiting unit 236 is implemented by a driving circuit DC (likewise, the invention is not limited thereto). In the present embodiment, a first input terminal of the comparator COMP receives the sampled current signal Ico output by the rectifier REC, and a second input terminal of the comparator COMP receives a reference value Iset. The reference value Iset is a reference for determining whether a transient change occurs to the AC current Iac on the filtering capacitor 220. An output terminal of the comparator COMP is coupled to the driving circuit DC. The driving circuit DC determines whether to enable the over current protection mechanism according to the over current determination signal Sde output by the comparator COMP to generate corresponding control signals S1 through S4 to switch the switching transistors Q1 through Q4 and control the power conversion operation of the inverting circuit 210.

For instance, when the sampled current signal Ico output by the rectifier REC is greater than or equal to the reference value Iset, the comparator COMP outputs the corresponding over current determination signal Sde to instruct the driving circuit DC to enable the over current protection mechanism. At this time, the driving circuit DC stops providing the control signals S1 through S4 to the switching transistors Q1 through Q4 within a period. The switching transistors Q1 through Q4 are turned off during the period until the comparator COMP determines that the sampled current signal Ico is less than the reference value Iset. The driving circuit DC disables the over current protection mechanism to provide the control signals S1 through S4 to the switching transistors Q1 through Q4 again to instruct the inverting circuit 210 to operate normally.

Additionally, in the present embodiment, the primary winding NP of the current transformer CT and the filtering capacitor 220 are coupled in series, and thus, the filtering capacitor 220 has a function of isolating a direct current. Hence, the signal induced by the secondary winding NS of the current transformer CT does not include any DC current. Accordingly, the over current protection circuit 230 of the present embodiment does not have an issue of magnetic flux reset, such that the power conversion operation of the overall inverter 200 becomes more stable.

FIG. 3 is a flowchart of an over current protection method of an inverter according to an embodiment of the invention. An over current protection method of the present embodiment is adaptive for the inverter 100 or 200 described above. With reference to FIG. 3, the over current protection method includes the following steps. An AC current on a filtering capacitor (e.g., the filtering capacitor 120 or 220) is detected, in which the filtering capacitor is coupled to an inverting circuit (e.g., the inverting circuit 110 or 210) and a load (e.g., the load 10) in parallel (step S310). Whether to enable an over current protection mechanism is determined according to the AC current to restrain a power conversion operation of the inverter (step S320).

To be more specific, the over current protection method illustrated in FIG. 3 may be further implemented by the steps illustrated in FIG. 4. With reference to FIG. 4, the over current protection method of the present embodiment includes the following steps. The AC current on the filtering capacitor is sampled (step S410). The sampled AC current is rectified to generate a sampled current signal (step S420). The sampled current signal is compared with a reference value to determine whether the sampled current signal is greater than or equal to the reference value (step S430). If the sampled current signal is greater than or equal to the reference value, the over current protection mechanism is enabled to restrain the power conversion operation of the inverter (step S440). If the sampled current signal is less than the reference value, the over current protection mechanism is not enabled, such that the inverting circuit is normally operated (step S450).

The over current protection methods of the embodiments described with reference to FIG. 3 and FIG. 4 may be sufficiently supported and taught by the descriptions of FIG. 1 and FIG. 2, and thus the similar or the same parts will not be repeated hereinafter.

To sum up, the invention provides an inverter and an over current protection method thereof. The inverter can detect an AC current on a filtering capacitor so as to determine whether to enable an over current protection mechanism accordingly. The current change of the filtering capacitor will be ahead of the voltage change of the filtering capacitor so that the inverter can enable the over current protection mechanism in advance in response to the AC current detected on the filtering capacitor when an AC output voltage of the inverter is changed significantly in a short period. The inverter can enable the over current protection mechanism timely to restrain the current of the inverter and won't be affected by the delay of the hardware or the software of the inverter itself. Therefore, stability of the power conversion operation of the inverter can be enhanced.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:
1. An inverter, comprising:
 an inverting circuit, configured to convert a DC input voltage into an AC output voltage and provide the AC output voltage to a load;
 a filtering capacitor, coupled to the inverting circuit and the load in parallel; and
 an over current protection circuit, coupled to the inverting circuit and the filtering capacitor and configured to provide an over current protection mechanism, wherein the over current protection circuit comprises:
  a current sampling unit, coupled to the filtering capacitor and configured to sample the AC current and rectify the sampled AC current to generate a sampled current signal, the current sampling unit comprises:
   a current transformer, having a primary winding and a secondary winding, wherein the primary winding is coupled to the filtering capacitor in series to isolate a direct current and thus a signal induced by the secondary winding of the current transformer does not include any DC current, a common node of the primary winding and the filtering capacitor is only connected to the primary winding and the filtering capacitor;
  wherein the over current protection circuit only detects an AC current flowing through the filtering capacitor and determines whether to enable the over current protection mechanism according to the AC current in order to restrain the power conversion operation of the inverting circuit.

2. The inverter according to claim 1, wherein the over current protection circuit further comprises:
 an over current determination unit, coupled to the current sampling unit and configured to generate an over current determination signal according to the sampled current signal, wherein the over current determination signal indicates a relative relationship between the sampled current signal and a reference value; and
 a current limiting unit, coupled to the inverting circuit and the over current determination unit and configured to determine whether to enable the over current protection mechanism according to the over current determination signal.

3. The inverter according to claim 2, wherein
when the sampled current signal is greater than or equal to the reference value, the current limiting unit enables the over current protection mechanism according to the over current determination signal to restrain the power conversion operation of the inverting circuit, and
when the sampled current signal is less than the reference value, the current limiting unit does not enable the over current protection mechanism according to the over current determination signal, such that the inverting circuit is normally operated.

4. The inverter according to claim 2, wherein the current sampling unit further comprises:
a rectifier, coupled to the secondary winding of the current transformer to generate the sampled current signal according to a signal on the secondary winding.

5. The inverter according to claim 4, wherein the over current determination unit comprises:
a comparator, having a first input terminal, a second input terminal and a output terminal, wherein the first input terminal is coupled to the rectifier to receive the sampled current signal, the second input terminal receives the reference value and the output terminal outputs the over current determination signal.

6. The inverter according to claim 5, wherein the current limiting unit comprises:
a driving circuit, coupled to the inverting circuit and the output terminal of the comparator and configured to control the switching of the inverting circuit according to the over current determination signal.

7. A over current protection method of an inverter, wherein the inverter comprises an inverting circuit, a filtering capacitor and an over current protection circuit, the over current protection method implemented by the over current protection circuit, wherein the over current protection circuit comprises a current sampling unit, coupled to the filtering capacitor and configured to sample the AC current and rectify the sampled AC current to generate a sampled current signal, the over current protection method comprising:
only detecting an AC current flowing through the filtering capacitor, wherein the filtering capacitor is coupled to the inverting circuit and a load in parallel, wherein the current sampling unit comprises a current transformer having a primary winding and a secondary winding, the primary winding is coupled to the filtering capacitor in series to isolate a direct current and thus a signal induced by the secondary winding of the current transformer does not include any DC current, a common node of the primary winding and the filtering capacitor is only connected to the primary winding and the filtering capacitor; and
determining whether to enable an over current protection mechanism according to the AC current to restrain the power conversion operation of the inverting circuit.

8. The over current protection method according to claim 7, wherein the step of detecting the AC current on the filtering capacitor comprises:
rectifying the sampled AC current to generate a sampled current signal.

9. The over current protection method according to claim 8, wherein the step of determining whether to enable the over current protection mechanism according to the AC current to restrain the power conversion operation of the inverting circuit comprises:
comparing the sampled current signal with a reference value;
if the sampled current signal is greater than or equal to the reference value, enabling the over current protection mechanism to restrain the power conversion operation of the inverting circuit; and
if the sampled current signal is less than the reference value, not enabling the over current protection mechanism, such that the inverting circuit is normally operated.

* * * * *